United States Patent
Walker

(10) Patent No.: US 7,175,722 B2
(45) Date of Patent: Feb. 13, 2007

(54) METHODS AND APPARATUS FOR STRESS RELIEF USING MULTIPLE ENERGY SOURCES

(76) Inventor: Donna M. Walker, 40388 Ladene La., Novi, MI (US) 48375

( * ) Notice: Subject to any disclaimer, the term of this patent is extended or adjusted under 35 U.S.C. 154(b) by 96 days.

(21) Appl. No.: 10/632,231

(22) Filed: Jul. 31, 2003

(65) Prior Publication Data

US 2005/0092402 A1 May 5, 2005

Related U.S. Application Data

(60) Provisional application No. 60/404,020, filed on Aug. 16, 2002.

(51) Int. Cl.
*C21D 10/00* (2006.01)
(52) U.S. Cl. .................................... 148/558
(58) Field of Classification Search ................ 148/558
See application file for complete search history.

(56) References Cited

U.S. PATENT DOCUMENTS

| | | | |
|---|---|---|---|
| 1,939,712 | A | 12/1933 | Mahoux |
| 2,848,775 | A | 8/1958 | Ettenreich |
| 3,640,704 | A | 2/1972 | Robertshaw et al. |
| 3,736,448 | A | 5/1973 | Hebel, Jr. et al. |
| 3,741,820 | A | 6/1973 | Hebel, Jr. et al. |
| 3,999,276 | A | 12/1976 | Brown et al. |
| 4,001,053 | A | 1/1977 | Igisu |
| 4,381,673 | A | 5/1983 | Klauba et al. |
| 4,968,359 | A | 11/1990 | Hebel, Jr. et al. |
| 5,242,512 | A | 9/1993 | Bagley et al. |
| 5,252,152 | A | 10/1993 | Seror |
| 5,914,055 | A | 6/1999 | Roberts et al. |
| 6,116,088 | A | 9/2000 | Schneider et al. |
| 6,159,315 | A | 12/2000 | Haszler et al. |
| 6,223,974 | B1 | 5/2001 | Unde |
| 6,338,765 | B1 | 1/2002 | Statnikov |

FOREIGN PATENT DOCUMENTS

EP  1 225 237 A1  7/2002

(Continued)

OTHER PUBLICATIONS

Product Catalog "Stress Relief Confidence: Effective, Efficient, Consistent", Meta-Lax by Ronal Technologies Inc., Copyright 2002, 4 pgs.

(Continued)

*Primary Examiner*—Sikyin Ip
(74) *Attorney, Agent, or Firm*—Dorbrusin & Thennisch PC

(57) ABSTRACT

Methods are presented for modifying a physical property of a structure, such as reducing or relieving remaining internal stress, in which two or more energy types are concurrently applied to the structure to change the physical property of interest in an accelerated fashion. A first energy type, such as heat, is applied according to time values and operational settings derived from a first order rate relationship for the first energy type and from a first order rate relationship for a second energy type. The second energy type, such as vibration or other time-varying energy form, is applied concurrently for the time value. Methods are also provided for determining operational settings for concurrent application of multiple energy types to a structure.

14 Claims, 7 Drawing Sheets

FOREIGN PATENT DOCUMENTS

FR    1334459    7/1963

OTHER PUBLICATIONS

"Kinetics of Precipitation in Aluminum During Continuous Cooling", J. W. Evancho and J. T. Staley, Metallurigcal Transactions, vol. 5, Jan. 1974. 5 pgs.

"A Time-Temperature Relationship for Rupture and Creep Stresses", F. R. Larson and James Miller, Transactions of the ASME, Jul. 1952, pp. 765-775.

"A Reaction-Rate Treatment of the Extrapolation Methods in Creep Testing", M Grounes, Journal of Basic Engineering, Mar. 1969, 4 pgs.

International Search Report, International Application No. PCT/US03/24449, International Filing Date Jan. 8, 2003, 4 pgs.

"Deformation and Fracture Mechanics of Engineering Materials", Richard W. Hertzberg, Copyright 1976, John Wiley & Sons, Inc., 7 pages.

"Solid State Reactions", *Materials Science and Technology*, Hermann Schmalzried, 1974 Academic Press, Inc., 10 pages.

"Mechanical Metallurgy", George E. Dieter, Copyright 1961, 1976 McGraw-Hill, Inc., 6 pages.

"Introduction to Ceramics", W. D. Kingery, H. K. Bowen and D. R. Uhlmann, Copyright 1960, 1976 John Wiley & Sons, Inc., 7 pages.

ized internal stresses may cause accelerated failures due to stress corrosion, fatigue, and premature overload fractures. These failures can occur in bridges, aircraft structures, ship hulls, pipelines, liquid storage tanks, rails, and reactor vessels, as well as in many other structures. Relieving or reducing internal stress in large structures is sometimes difficult, particularly where the structure is in a remote location. For example, stress may occur as a result of welding pipes together in remote areas to create an oil pipeline, or from welding, forming, and/or assembling structural components in bridges, ships, or airplanes. For large and small structures, premature degradation or failure of the structure may result from remaining internal stresses. Durability and performance of welded parts are affected by internal stresses that can reduce fatigue life and corrosion resistance. Welding involves providing high temperatures to melt a welding rod or other filler metal used to join two sections of plates. The base metal joining surfaces are also heated to melting temperatures during the welding process. The presence of thermal gradients adjacent to the weld line affects the microstructure of the plate. Thermal gradients are the primary cause of residual stresses along the weld lines and contribute to diminished mechanical properties and reduced corrosion resistance in the heat-affected zone compared to the base material. In addition, welding, especially when coupled with variations in thickness, leaves significant internal stresses as the material attempts to adjust to the varying thermal gradients.

METHODS AND APPARATUS FOR STRESS RELIEF USING MULTIPLE ENERGY SOURCES

REFERENCE TO RELATED APPLICATION

This application claims priority to and the benefit of U.S. Provisional Patent Application Ser. No. 60/404,020, which was filed Aug. 16, 2002, entitled A PROCESS AND DEVICE FOR METAL OR METAL ALLOY STRESS RELIEF, the entirety of which is hereby incorporated by reference.

FIELD OF INVENTION

The invention is generally related to the field of changing physical properties of structures and more particularly to methods and processes for changing physical properties of structures using two or more energy sources.

BACKGROUND OF THE INVENTION

Manufactured parts are often fabricated using a variety of mechanical and thermal processing steps, such as heat treating, welding, and others, that cause mechanical stress within the materials. Residual stress remaining in a manufactured part has been found to adversely affect fatigue life, corrosion susceptibility, and strength, wherein areas near weld joints have been found to be particularly susceptible to stress problems. In many machines and structures, component parts may suffer early degradation in load bearing capability, corrosion resistance, and/or catastrophic failure due at least in part to internal stress remaining after fabrication or welding. Furthermore, the repair and/or replacement of components is costly in many situations.

Local-
Accordingly, techniques have been developed for relieving internal stresses in manufactured parts that may be employed during or after fabrication or welding operations. However, conventional stress-relief processes are typically time-intensive, requiring application of energy to the stressed parts for long periods of time. In a manufacturing setting, lengthy stress-relief processes are costly in terms of total fabrication time, throughput, and energy. Time and energy are also an important consideration in stress-relieving structures in the field. For example, performing a stress-relief operation on an aircraft in a commercial airline fleet requires that the aircraft be grounded during the stress-relief operation. For large structures, such as welded pipes in a remote pipeline, ship or aircraft hulls, etc., the energy for the stress-relief operation often needs to be brought to the worksite, wherein time-intensive conventional stress-relief techniques are particularly costly. Accordingly, there remains a need for improved stress-relief techniques and systems for reducing stress in manufactured parts and/or welded structures.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to techniques for changing physical properties of a structure using concurrent application of multiple energy types to the structure, and methodologies for determining operational settings for concurrent application of multiple energy sources to a structure.

The concurrent provision of multiple energy types in accordance with the present invention may be advantageously employed to significantly reduce the time and/or energy required to change a physical property of interest, such as reducing remaining internal stress in manufactured parts or other structures, compared to previous techniques. The invention may find utility in technology areas of solid diffusion, including but not limited to heat treating and aging, surface diffusion treatments for metals (e.g., oxynitriding, nitriding, carburizing, etc.), zone refining of metals, battery manufacturing, doping semiconductors (e.g., to speed processing or lower temperature in semiconductor manufacturing), or other technologies where time is spent while atoms diffuse through a material. The invention may also be employed in areas of liquid diffusion, including but not limited to osmotic membranes (e.g., water purification, chemicals separations, etc.), liquid chromatography (e.g., chemicals separation, etc.), and chemical mixing.

In accordance with one aspect of the invention, a method is provided for changing a physical property of a structure, wherein the physical property can be creep rate, creep, strain, stress, residual stress, internal stress, aging, mixing, motion through a membrane, or any property, such as those that may be controlled according to an Arhennius-type first order rate equation. The method comprises providing a first energy type to a structure by performing a first energy process according to an operational setting. The operational setting and/or a time value is selected according to a first order rate relationship for the first energy process, a first order rate relationship for a second energy process, and according to a desired physical property value for the structure. In one example, the physical property may be internal stress, where the desired physical property value is one of a remaining internal stress value and an internal stress reduction value. The relationship for the first energy process relates application of the first energy type to the structure and a physical property of the structure, and the relationship for the second energy process relates application of the second energy type to the structure and the physical property. The method further comprises providing energy of the second type to the structure at an energy level above an activation energy for the structure, where the first and second energy types are provided concurrently for at least the time value.

The first and second energy types may individually be any form of energy applied to a structure. In one example, the first energy type is thermal and the second energy type is time varying, such as oscillatory mechanical vibration. The first order rate relationships may be Larson-Miller (L-M) relationship curves that relate the application of thermal and oscillatory energy to the structure and the physical property of interest. A first L-M parameter is determined according the first L-M relationship, corresponding to the desired physical property value, and a second L-M parameter is determined according to the second L-M relationship, also corresponding to the desired physical property value. For example, the first L-M parameter may be determined according a first L-M relationship (e.g., L-M curve, etc.), wherein a desired remaining internal stress value is selected along the Y axis of the first L-M curve, and the corresponding parameter ("P") value is ascertained along the X axis ($P_1$). A second L-M parameter is determined for the desired physical property value according to a second L-M relationship (e.g., a second L-M curve) by locating the desired internal stress value on the Y axis of the second L-M curve, and locating the corresponding second parameter value (e.g., $P_2$) along the X axis. A third L-M parameter (e.g., $P_3$) may optionally be determined according to the first and second L-M parameters ($P_1$ and $P_2$), such as by subtraction (e.g., $P_3 = P_1 - P_2$).

An operational setting and a time value are then selected according to the third parameter $P_3$ using the first order relationship for applying the first energy type to the structure. One of a temperature setting and a time value is selected for applying the first energy type to the structure, for example, based on structural, equipment, economic, or other considerations, or randomly. The other value is then determined or selected according to the third parameter $P_3$ (e.g., based on $P_1$ and $P_2$), the first L-M relationship, and according to the previously selected value. For instance, a temperature value may be selected based on thermal heating equipment limitations, structural material properties, etc., and a time value is then determined by solving a first order rate equation using the pre-selected temperature value and the third parameter. In another implementation, the time value may be selected first, and the temperature setting is then determined according to the time value, the first and second parameters, and the first order rate equation.

In accordance with another aspect of the invention, a method is provided for determining operational settings for concurrent application of multiple energy types to a structure. The method comprises determining a first parameter according to a desired physical property value for the structure and according to a first order rate relationship for a first energy process that relates application of a first energy type to the structure and the physical property. A second parameter is determined according the desired physical property value and according to a first order rate relationship for a second energy process that relates application of a second energy type to the structure and the physical property. A time value or an operational setting for the first energy process is selected, for example, according to structural, equipment, economic considerations, etc. The remaining time value or operational setting is selected according to the first and second parameters (e.g., or a third parameter that relates the first and second parameters), according to the first order rate relationship for the first energy process, and according to the previously selected one of the time value and the operational setting. The method may further comprise determining the first order rate relationships for the first and second energy processes.

Other aspects of the invention provide methods for changing a physical property of a structure by applying two or more energy types concurrently, methods for determining operational settings for concurrent application of multiple energy types to a structure, which employ a combined first order rate relationship for multiple energy types, and systems for concurrent application of multiple energy types to change a structure property. In these methods, the first order rate relationship characterizes a relationship between concurrent application of the first and second energy types to the structure and a physical property of the structure. Operational settings are selected by determining a parameter corresponding to a desired physical property value and deriving one or more settings from the L-M parameter.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
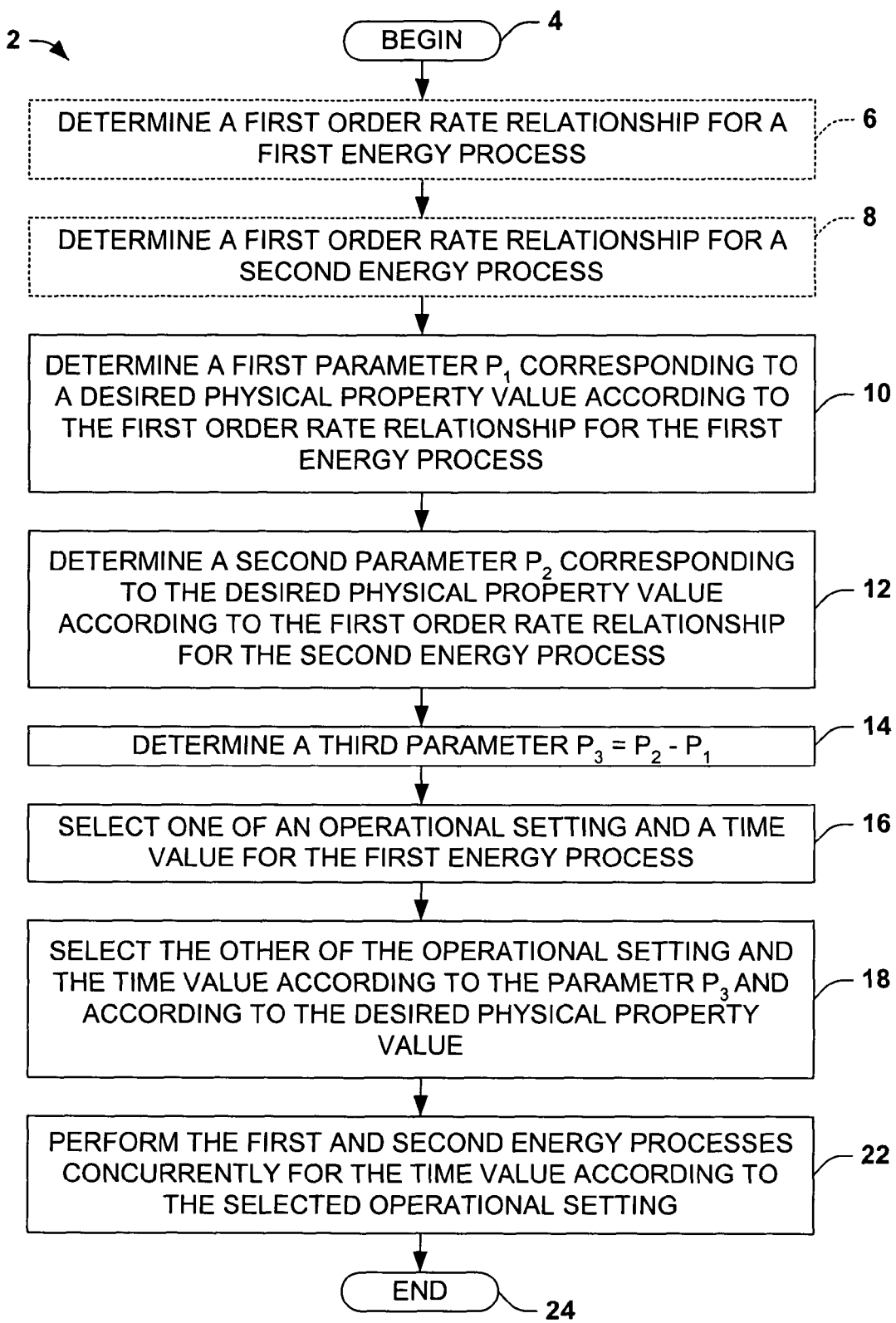
FIG. 1 is a flow diagram illustrating an exemplary method of modifying or changing a physical property of a structure using concurrent application of multiple energy types in accordance with the present invention.

One or more implementations of the present invention will now be described with reference to the drawings, wherein like reference numerals are used to refer to like elements throughout. The invention relates to methods for stress-relieving or changing other physical properties of a structure using concurrent application of multiple energy types to the structure, as well as to methods for determining operation settings for concurrent application of multiple energy sources to a structure. The invention finds particular utility in association with stress relieving structures such as manufactured parts, assemblies of multiple parts, welds, or other structures, wherein concurrent application of a thermal energy type and one or more time varying energy types can provide for temporal acceleration of the stress-relief operation not previously attainable using conventional stress-relief techniques. However, the invention may also be utilized in association with any property changing processes, such as those that may be modeled according to first order rate equations, wherein a plurality of energy types or sources are employed to accelerate the change in one or more physical properties, such as remaining internal or residual stress. In this regard, the invention is not limited to the particular examples set forth herein.

Figure 2A:
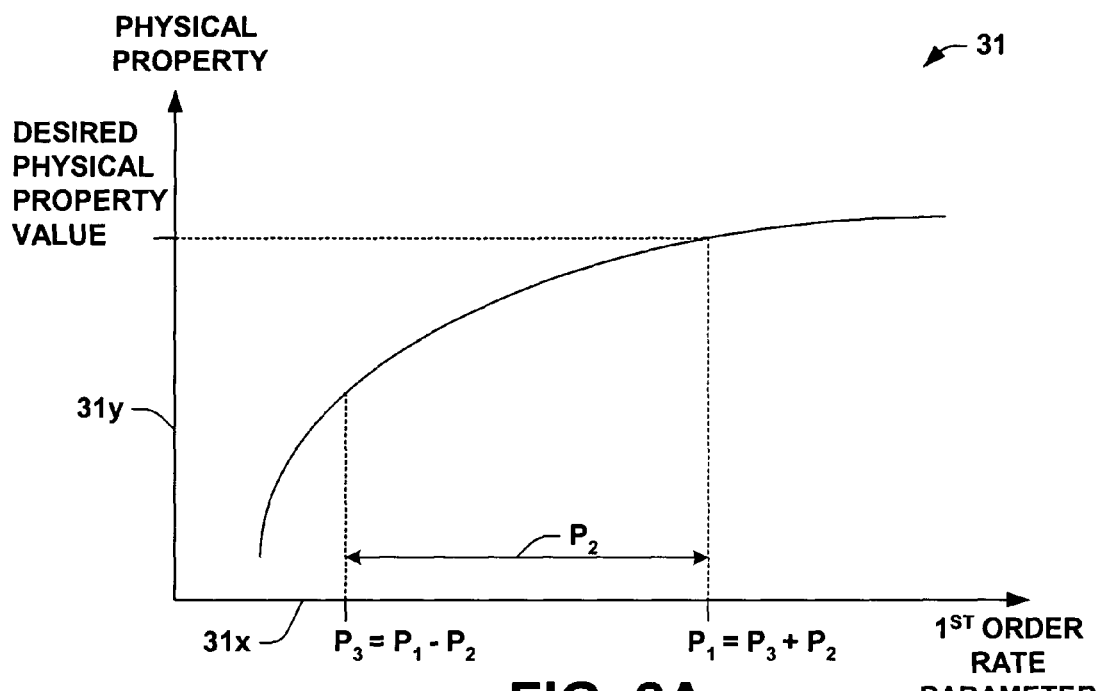
FIG. 2A is a plot illustrating an exemplary first order rate relationship curve for a first energy process in accordance with the invention.
Figure 2B:
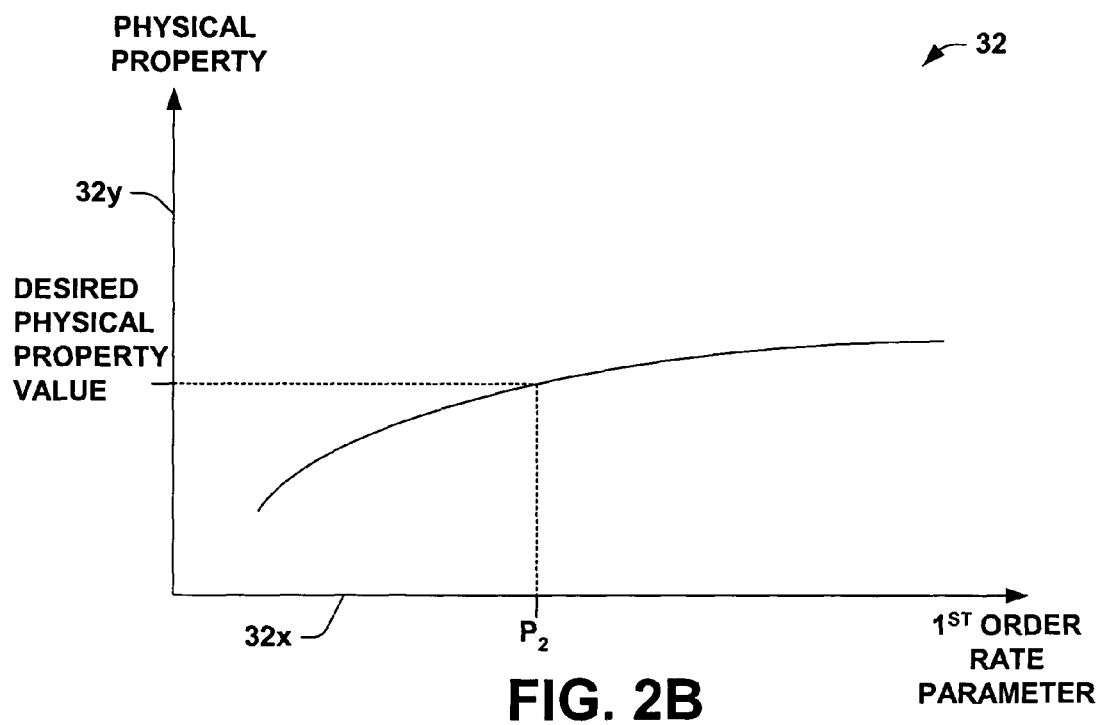
FIG. 2B is a plot illustrating an exemplary first order rate relationship curve for a second energy process in accordance with the invention.

Referring initially to FIGS. 1, 2A, and 2B, an exemplary method 2 is illustrated in FIG. 1 for modifying or changing a physical property of a structure using concurrent application of multiple energy types in accordance with the present invention. Although the exemplary process or method 2 and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention.

The method 2 illustrates characterization of two energy application processes at 6 and 8, correlation of first order rate relationships and first order rate parameters ("P") for different energy types at 10–14, selection of operational and time values or settings at 16–18 and application of multiple energy types at 22. It is noted at the outset that certain aspects of the invention provide methods including the characterization, correlation, setting selection, and energy application features described herein, while other methods of the present invention do not require all these acts. As one example, the invention provides methods for changing physical properties of structures that may require only certain of the acts illustrated for the exemplary method 2. The invention also provides methods for determining operational settings for concurrent application of multiple energy types that may not require all the acts illustrated in the exemplary method 2.

Beginning at 4, a first order rate relationship is determined at 6 for a first energy process and another first order rate relationship is determined at 8 for a second energy process. The first order rate relationships determined at 6 and 8 may be curves, mathematical expressions resulting from curve-fitting a series of data points, or any characterization or expression of a relationship between application of the corresponding energy type to the structure and a physical property of interest, for example, including but not limited to Larson-Miller relationships and/or equivalents thereof. Thus, the first order rate relationship determined at 6 relates application of the first energy type to the structure and the physical property of the structure, and the first order rate relationship determined at 8 characterizes the relationship between application of the second energy type to the structure and the physical property. FIG. 2A provides a plot 31 illustrating an exemplary first order rate relationship curve for a first energy type, and FIG. 2B shows a plot 32 illustrating an exemplary first order rate relationship curve for a second energy type in accordance with the invention.

A first order rate relationship may be expressed as an equation used to model or represent a process that relies upon diffusion or dislocation motion over time. For example, stress-relief may be expressed as a first order rate equation representing passage of dislocations through a material. In one implementation of the invention, L-M equations may be derived by taking the log of the Arrhenius equation, and may be plotted as a curve of a physical property such as remaining internal or residual stress on a Y axis vs. a first order rate parameter (e.g., a Larson-Miller parameter) "P" on the X axis. In the example of stress-relief through application of thermal energy, a first order rate relationship can be plotted as remaining internal stress vs. a thermal first order rate parameter Pt, which incorporates both time and temperature. Alternatively, actual structures may be stressed and processed using thermal stress-relief operations at various times and temperatures in order to create a plot of several remaining internal stress vs. first order rate parameter values.

It is noted at this point that the physical property or characteristic of interest may be plotted on reverse scales along the Y axis of such relationship curves or plots within the scope of the invention. These and any other suitable techniques may be employed at 6 and 8 to determine the first order rate relationships for the first and second energy processes in accordance with the present invention. It is noted that more than two energy types may be provided to the structure in accordance with the invention and the appended claims, wherein corresponding first order rate relationships are employed to determine one or more operational settings and/or time values for acceleration of the change in the physical property of the structure. It is further noted that the first order rate relationships may be determined using any samples made of the same or similar materials as the structures to be processed, wherein the samples may, but need not, be of the same size, shape, etc., as the structures of interest. In this regard, the first order rate relationships and the first order rate parameters are applicable to any structure made of the material of interest, whereby the first order rate relationships and the parameters derived therefrom are universally applicable to any structure made from that material.

At 10–14, first order rate parameters and first order rate relationships are correlated for different energy types. Alternatively, as discussed below with respect to FIG. 5, a composite or combined first order rate relationship may be determined for multiple energy sources, where the correlated effect of concurrent application of the multiple energy types to a structure is embedded or embodied in the combined first order rate relationship and specific first order rate parameters thereof. In the method 2, a first order rate parameter $P_1$ is determined at 10 according the first order rate relationship for the first energy process, wherein the first parameter $P_1$ corresponds to the desired physical property value for the structure.

In FIG. 2A, the desired physical property value is located along the Y axis $31y$ of the plot 31, and the corresponding point on the first order rate curve is identified as $P_1$ along the X axis $31x$. The same desired physical property value is used at 12 in the method 2 to determine a second parameter $P_2$ according to the first order rate relationship for the second energy process. For example, in FIG. 2B, the desired physical property value is located along the Y axis $32y$ of the plot 32, and the corresponding point on the first order rate curve is identified as the second parameter $P_2$ along the X axis $32x$.

The operational settings for concurrently providing two or more energy types to the structure are selected at 16 and 18 according to the first order rate parameters. One of a time value and an operational setting for the first energy type are selected according to one or more selection criteria, including but not limited to structural, equipment, or economic considerations, or arbitrarily. The other variable is then selected or determined according to the first and second parameters $P_1$ and $P_2$ using the first order rate relationship associated with the first energy process.

Toward that end, a third parameter $P_3$ is optionally determined at 14 according to the parameters $P_1$ and $P_2$, such as by subtracting $P_2$ from $P_1$, wherein the time and/or operational settings can then be selected or determined in accordance with $P_3$ at 18. The correlation of the first order rate parameters $P_1$ and $P_2$ in determining the operational and time settings for application of the first energy type results in the third parameter $P_3$ that reflects a temporal acceleration achievable within the scope of the invention. This acceleration, in turn, facilitating stress-relief or implementation of other multiple energy type processes to change a physical property of a structure in less time and using less energy than was possible using previous methods. The inventor has appreciated that dislocation motion within a structure (e.g., such as during stress relief) occurs by a diffusion process and can be described by a first order rate equation:

$$D = D_0 \, e^{-\frac{Q}{RT}}, \quad (1)$$

where
D=rate of diffusion at some time, t
$D_0$=initial rate of diffusion
Q=activation energy for reaction to begin
R=universal gas constant
T=temperature in degrees K (Kelvin).

Generally, the rate of stress relief obtained using thermal methods is driven by diffusion and can be described using the Arrhenius first order rate equation (2), named after the chemist Svandte Arrhenius:

$$r(T) = A \, e^{-\frac{\Delta H}{RT}}, \quad (2)$$

where
r=rate of stress relief at some time, t
A=constant
H=free energy of the reaction
R=universal gas constant
T=temperature in degrees K.

The level of stress relief can be related to a first order rate relationship or equation. In one example, a Larson-Miller (L-M) equation is obtained by taking the log of the Arrhenius equation (2).

Assuming $$r \propto \frac{1}{t},$$

and rearranging, the L-M equation for thermal stress relief may be expressed as:

$$P = \frac{\Delta H}{R} = T(C + \log t), \quad (3)$$

where P is the L-M first order rate parameter. Other specific forms of first order rate expressions may be used, which are logarithmic expressions of an Arrhenius equation, wherein Larson-Miller or "L-M", as used herein, is intended to include all such first order rate relationships and associated parameters which characterize a logarithmic expression of the Arrhenius equation. The first order rate equation (3) may be plotted as shown in FIG. 2A with the first order rate parameter P on the X axis with the physical property of interest (e.g., stress relief or remaining internal or internal stress) on the Y axis. For example, such first order rate curves may be obtained for a thermal energy process using three or more data points determined by experimental procedures at different times and temperatures, although other techniques may be employed at 6 and 8 above for determining the first order rate relationships within the scope of the invention. The thermal first order rate curve (e.g., plot 31 in FIG. 2A) can be used to predict the time/temperature combination that may be employed to achieve any desired physical property value (e.g., stress relief level).

The inventor has appreciated that internal or residual stress relief can primarily be achieved by moving dislocations and reducing the overall dislocation density, and/or the density of other lattice defects such as stacking faults. A component of the overall stress state may be due to local lattice strains, but is anticipated to be of absolute values. This component is pure elastic strain and is local within the lattice. The formation of a dislocation will result when the strain reaches a certain value equivalent to the activation energy. No dislocation interaction will occur unless it is energetically favorable to do so. When energy, whether in the form of heat or any time-varying (e.g., oscillatory, periodic, pulsed) applied energy that can cause a pressure wave to be generated, is applied to a crystalline solid, energy is added to the dislocations that results in exciting their motion. Since any system will move to the lower energy state, the dislocations will try to attain a lower energy configuration by combining or annihilating, thus reducing the internal stresses in the material.

In addition, the inventor has appreciated that similar mathematical relationships should hold for any stress relief or other property changing method that causes dislocation motion using a diffusion process, and can thus be described by the Arrhenius first order rate equation (2) above. In accordance with the present invention, an acceleration results in the diffusion process through the concurrent application of multiple energy types to a structure for changing a physical property (e.g., stress relief) where the time and operational settings are determined as described herein. To further illustrate the acceleration results, the following derivation is provided for an example wherein thermal energy and vibration energy are concurrently applied to stress-relieve a structure.

Assuming that the matrix of the material or part in question can be partitioned into strained and non-strained portions, each with a concentration C, the total concentration may be expressed as:

$$C_{(total)} = C_{s\ (strained)} + C_{n\ (non-strained)} \quad (4)$$

In the case of strain relief, the following relationship holds:

$$C_s \rightarrow C_n \quad (5)$$

The rate of change of concentration of the strained portion during stress relief may be expressed as:

$$\frac{dC_s}{dt} = -k \cdot C_s \quad (6)$$

for the rate change of a reaction, where $$k = A\,e^{-\frac{\Delta H}{RT}}.$$

Thus $$\frac{dC_{sv}}{dt} = -k_v \cdot C_{sv}, \quad (7)$$

where $k_v$ is the Arrhenius equation for an oscillatory (vibratory) second energy type, and:

$$\frac{dC_{sT}}{dt} = -k_v \cdot C_{sT}, \quad (8)$$

where $k_T$ is the Arrhenius equation for a thermal energy type.

The total for the combined method is:

$$\frac{dC_s}{dt} = \frac{dC_{sv}}{dt} + \frac{dC_{sT}}{dt} = -(k_v + k_T) \cdot C_s. \quad (9)$$

Solving for $C_s(t)$:

$$C_s(t) = A\,e^{-(k_T+k_v)t} + B \quad (10)$$

Applying boundary conditions for t=0 and t=∞:

$$C_s(0) = A\,e^{-(k_T+k_v)\cdot 0} + B = A + B, \text{ and} \quad (11)$$

$$C_s(t) = A \cdot 0 + B = B \quad (12)$$

Combining equations (11) and (12):

$$A = C_s(0) - C_s(\infty) \quad (13)$$

Substituting into (10):

$$C_s(t) = [C_s(0) - C_s(\infty)]e^{-(k_T+k_v)t} + C_s(\infty), \text{ and} \quad (14)$$

$$C_s(t) = C_s(0)e^{-(k_T+k_v)t} + C_s(\infty)[1 - e^{-(k_T+k_v)t}] \quad (15)$$

from the boundary conditions of $C_s(0)=1$ and $C_s(\infty)=0$. Thus:

$$C_s(t) = e^{-(k_T+k_v)t}. \quad (16)$$

Applying L'Hopital's rule and substituting for t at completion:

$$C_s(t) = e^{-(k_T+k_v)} \quad (17)$$

For the case of two diffusion-controlled processes occurring simultaneously then, where k=Arrhenius equation:

$$\frac{1}{t} = A\,e^{-\left(\frac{\Delta H_T + \Delta H_v}{RT}\right)}. \quad (18)$$

Taking the natural log:

$$-\ln t = \ln A - \left(\frac{\Delta H_T + \Delta H_v}{R}\right)\left(\frac{1}{T}\right). \quad (19)$$

Rearranging and converting to log:

$$\left(\frac{\Delta H_T + \Delta H_v}{R}\right) = T(C + \log t). \quad (20)$$

Thus, for any combination of simultaneously applied stress relief processes, the sum of the stress relief process rates can be related to the first order rate parameter P. The oscillatory process, whether using sound, mechanical vibration, laser impulses, or some other oscillatory or time-varying applied energy process, is usually performed at a fixed temperature, where time, frequency, and amplitude are the variables. The vibration frequency and amplitude settings can be determined according to any suitable techniques so as to provide energy at or above the activation energy of the material of interest within the scope of the present invention, for example, by identifying a resonant frequency for the structure and the system in which the structure is to be mounted during processing, and selecting a frequency at or near the resonant frequency. In this regard, the frequency may be adjusted during processing as the resonance point changes, wherein the invention is not limited to fixed frequency or fixed amplitude implementations for providing time varying energy to the structure. The inventor has also appreciated that frequency may have a weak dependence on temperature, that can be calculated as follows:

$$c = \lambda f, \quad (21)$$

where c=speed of sound in a material
λ=f (specimen dimension)
f =frequency of harmonic.

Also:

$$c = \left[\frac{Y}{\rho}\right]^{\frac{1}{2}}, \qquad (22)$$

where Y=Young's modulus
ρ=density of material.

The relationship between density and temperature is expressed as:

$$\rho=\rho_0(1+\beta T), \qquad (23)$$

where $\beta=3\, c_{te}$ and $c_{te}$ is the coefficient of thermal expansion. Solving for frequency:

$$\lambda f = \left[\frac{Y}{\rho}\right]^{\frac{1}{2}}, \text{ and} \qquad (24)$$

$$f = \left[\frac{Y}{\rho}\right]^{\frac{1}{2}}\left(\frac{1}{\lambda}\right). \qquad (25)$$

Including the variation with temperature, the frequency is expressed as:

$$f = \left[\frac{Y}{\rho_0(1+\beta T)}\right]^{\frac{1}{2}}\left(\frac{1}{\lambda}\right) \qquad (26)$$

Thus, the working frequency f, is a function of $$\frac{1}{T}.$$

Consequently, as the temperature T changes, the working frequency will shift as well. Thus, for greatest efficiency of stress relief, frequency can be adjusted to a final value once the processing temperature is reached. For some oscillatory techniques, this is believed to be a very weak relationship at best and so adjustments in the oscillatory operational frequency setting may, but need not be made in accordance with the invention. Because of the cyclic lattice displacement by wave energy is proportional to Young's modulus E and to Poisson's ratio within a single method, the frequency/modulus relationship will be unique to an alloy and product form and thus may be advantageously determined by experimental procedures on the specific part in question.

Furthermore, the resonant frequency may change as a structure is stress relieved, wherein adjustments to the frequency of a time varying energy type may be made accordingly. In addition, frequency may also be highly dependent on part dimension. In general, though, specific frequency ranges for alloys can be predetermined for a specific method of frequency generation, whether sonic, laser, electrical, magnetic, mechanical, and microwave, or some other type, wherein adjustments according to specific structures and mounting systems are contemplated as falling within the scope of the invention.

Returning to FIG. 1, once the first order rate parameters $P_1$–$P_3$ have been determined at 10–14, the operational setting and time value are selected in accordance therewith at 16 and 18. One operational setting for the first energy process or the time value for concurrent processing is selected at 16, such as a temperature setting or a concurrent processing time setting where the first energy type is thermal. The first variable selected (e.g., independent variable) may be chosen at 16, based on structural, equipment, economic, or other considerations, or randomly. In one example, processing equipment, such as thermal energy sources, may have upper limits on temperature, and/or it may be desired to maintain the structure at or below a safe temperature to avoid changing the structure temper or melting the structure, whereas a minimum temperature value would be a critical temperature for the material to exceed the activation energy therefor. In another example, a section of a ship hull, aircraft structure, or bridge may be difficult to bring to a very high temperature, due to ambient conditions and/or heat sinking from attached structures, wherein such considerations may be taken into account in selecting a temperature setting at 16.

At 18, the other one of the operational setting and the time value is selected or determined according to the first order rate parameter $P_3$ (e.g., or simply in accordance with $P_1$ and $P_2$), and also in accordance with the previously selected (e.g., independent) variable. For the above example where a temperature setting was selected at 16, the time value is determined at 18 according to the temperature setting and the parameter $P_3$ for application of the first energy type to the structure using the first order rate relationship for the thermal energy process. The first order rate relationship is used, for example, by evaluating a corresponding first order rate equation (e.g., equation (3) above) for the first energy process, using the parameter $P_3$ and the temperature setting as independent variables, and solving for the dependent variable, which is the time value in this example.

Operation settings for the second energy process can be selected according to other criteria for concurrent application of energy together with the first energy process. For example, frequency and/or amplitude settings may be selected for an oscillatory second energy process, wherein the structure, together with the system in which it is mounted for processing, is scanned to determine a resonant frequency. The processing frequency may then be chosen to be at or near the resonant frequency, wherein the frequency may be adjusted during processing. The frequency and amplitude of such an oscillatory second energy process are also adjusted such that the energy provided thereby is above an activation energy for the material of the structure.

It is noted in this regard, that whereas the first order rate relationships and first order rate parameters determined at 6–14 above are generally material specific and structure independent, that one or more of the operational settings for application of the energy types to the structure may be chosen according to material specific considerations (e.g., activation energy, etc.), as well as according to the specifics of a particular structure and/or a system in which the structure is being processed, such as mass, size, shape, or other system or structure characteristics. Once the operational and time settings or values have been selected at 16 and 18, the method 2 proceeds to 22, where the first and second energy processes are performed to apply the first and second energy types to the structure concurrently for at least the selected time value to achieve accelerated change in the physical property of the structure, before the method 2 ends at 24. In certain implementations of concurrent energy application in which one of the energy types is thermal, the heat may preferably be turned off first, leaving the oscillatory energy running until the part being processed (e.g., stress-relieved) achieves a minimum temperature for dislocation mobility.

As exemplified in FIGS. 1, 2A, and 2B, the invention provides methods for determining operational settings and time values for concurrent application of multiple energy types to a structure to change a physical property of the structure, that may be employed alone or in conjunction with the actual processing of structures to change a physical property of interest. The determination of the first order rate relationships (e.g., in 6 and 8 above) may be done in a laboratory setting using sample specimens of a given material type to determine, or appropriate pre-existing first order rate relationships may be used. With these, the first order rate parameters can be determined (e.g., at 10–14) for a desired physical property value, and the operational settings and time values can be selected (e.g., in 16 and 18 above). Thereafter, the first and second energy processes may be applied to any structure of the material for which the first order relationships and parameters have been determined, wherein one or more operational settings (e.g., such as vibration frequency) may be selected according to processing system particulars (e.g., system resonant frequency).

It is further noted that the various aspects of the invention may be employed in concurrent application of more than two energy types. Thus, the invention contemplates concurrent application of any integer number N different energy types, where N is a positive integer greater than 1, wherein first order rate relationships (e.g., derived or pre-existing) may be employed in determining N first order rate parameters (e.g., $P_1 \ldots P_N$) corresponding to a desired physical property value. One or more operational settings and/or a time value may then be determined according to these parameters, or the parameters may be correlated using another parameter (e.g., $P_{N+1}=P_1-(P_2+P_3+\ldots+P_N)$). In addition, as illustrated and described below with respect to FIG. 5, a single first order rate relationship may be derived or obtained for concurrent application of more than one energy type, wherein fewer than N parameters may be needed in selecting the operational and time settings and values for application of N energy types. In one example, a single first order rate relationship may be employed that relates application of N energy types to a structure and a physical property of the structure, wherein a single parameter may be used in selecting the operational and time settings and values. In this regard, all such alternate implementations are contemplated as falling within the scope of the invention and the appended claims, wherein the illustrated implementations are merely examples.

Figure 3A:
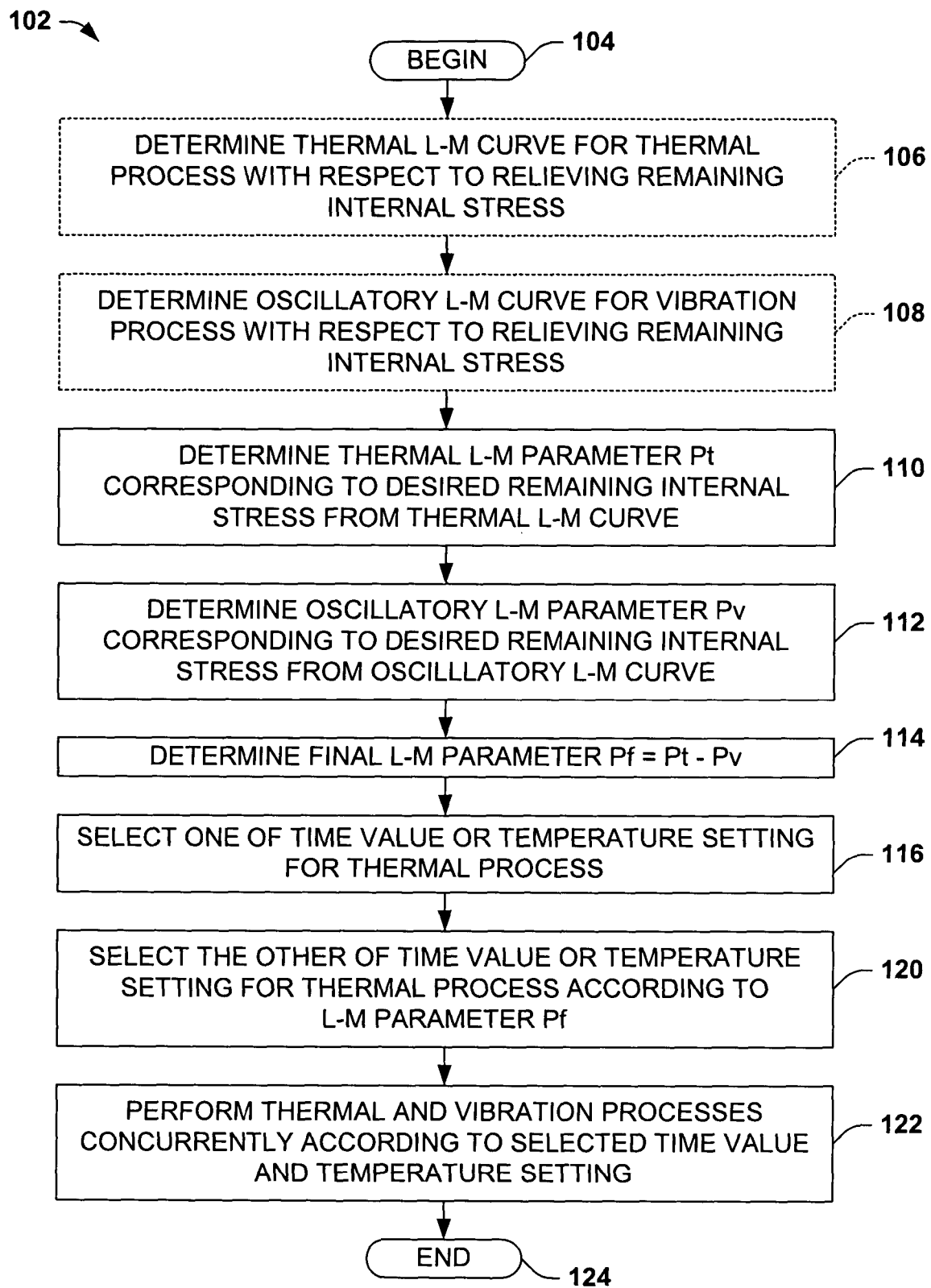
FIG. 3A is a flow diagram illustrating an exemplary method of stress relieving a structure in accordance with the invention.
Figure 3B:
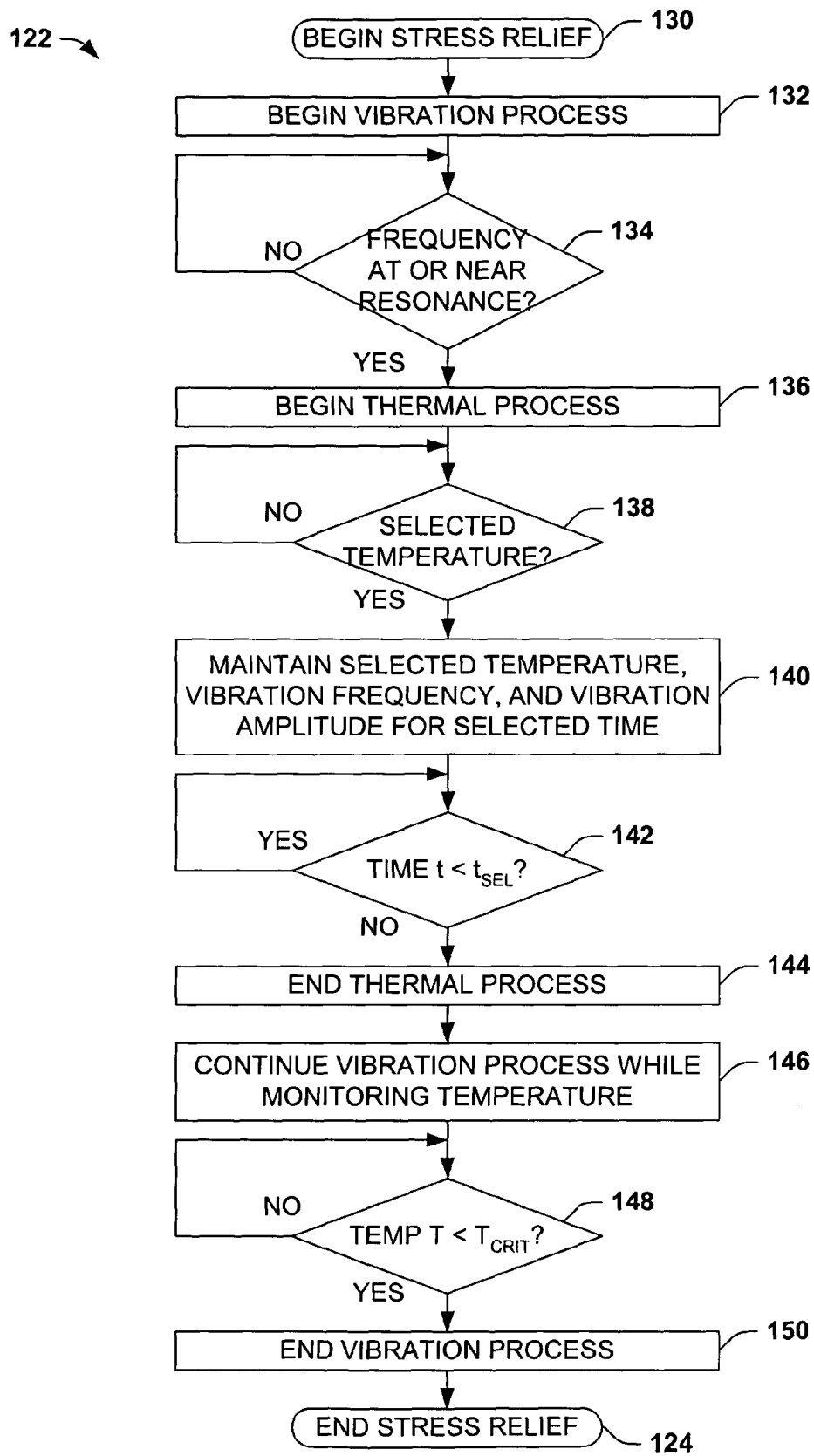
FIG. 3B is a flow diagram illustrating further details of the exemplary stress-relief method of FIG. 3A.
Figure 4A:
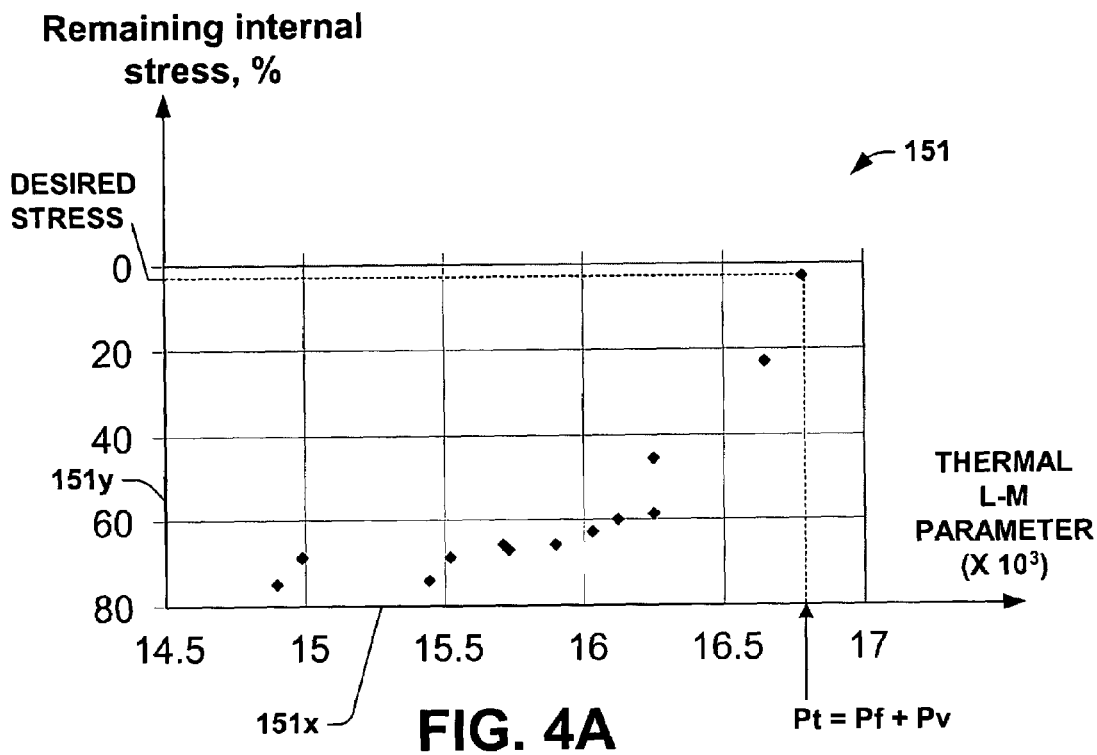
FIG. 4A is a plot illustrating an exemplary Larson-Miller (L-M) relationship curve for application of thermal energy to stress-relieve 7055-T7 aluminum structures in accordance with the invention.
Figure 4B:
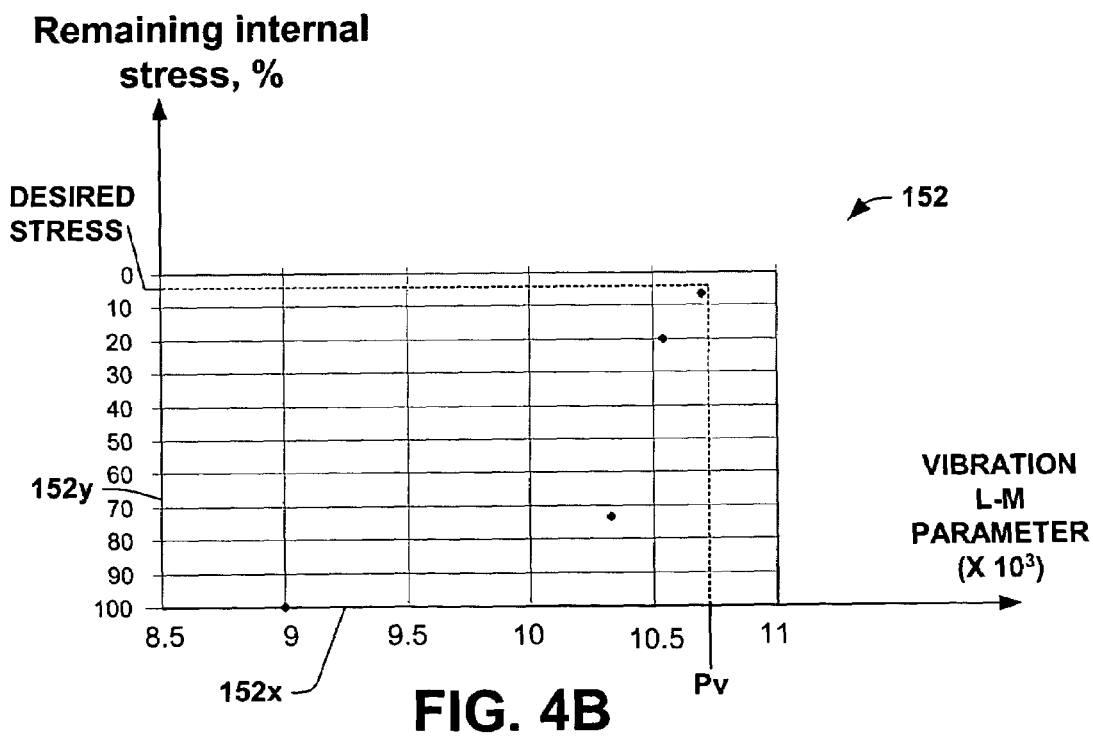
FIG. 4B is a plot illustrating an exemplary Larson-Miller relationship curve for application of oscillatory vibration energy to stress-relieve 7055-T7 aluminum structures in accordance with the invention.
Figure 4C:
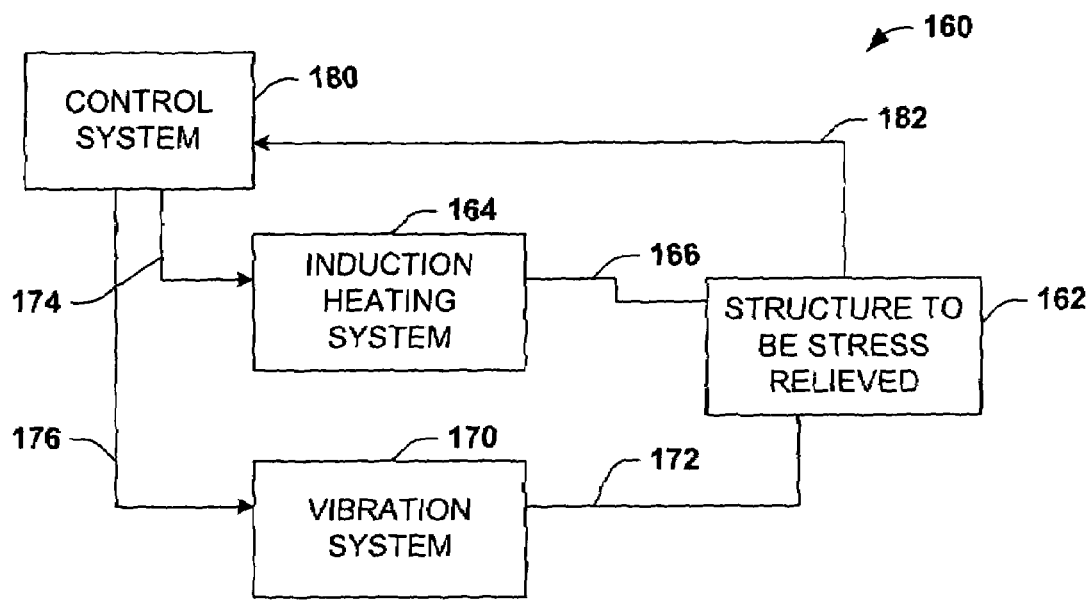
FIG. 4C is a schematic diagram illustrating an exemplary system for stress-relieving a structure in which various aspects of the invention may be carried out.
Figure 4D:
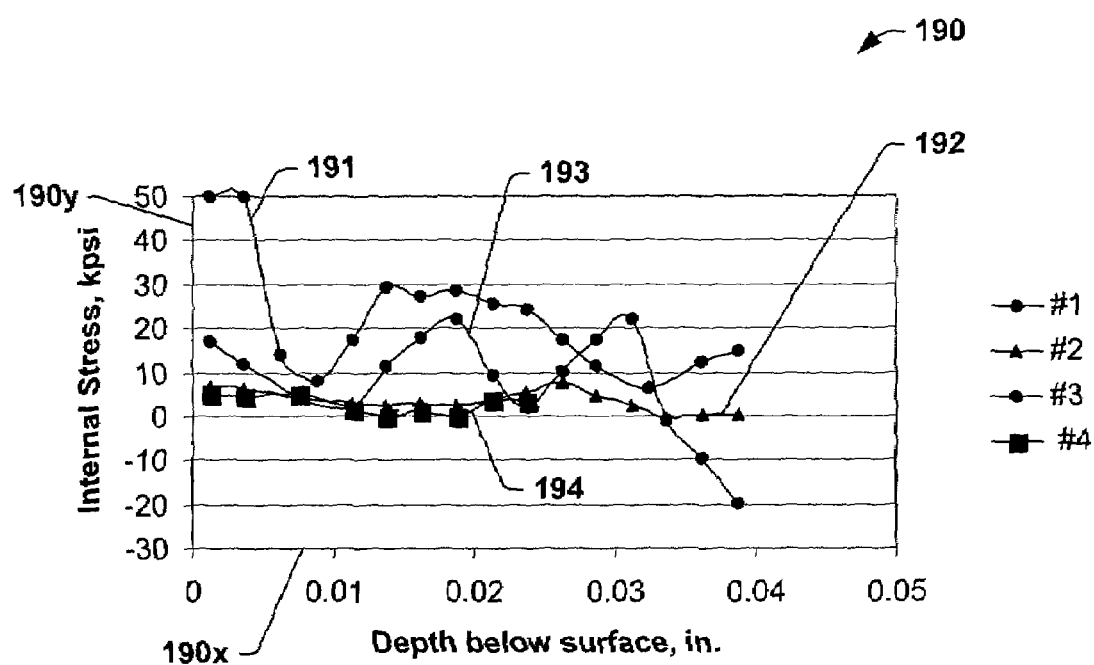
FIG. 4D is a plot illustrating comparative stress relief results for sample structures processed in accordance with the invention and samples processed according to conventional techniques.

Referring now to FIGS. 3A, 3B, and 4A–4D, the invention has been successfully implemented in reducing remaining internal (e.g., residual) stress in aluminum structures using concurrent application of thermal and oscillatory energy (e.g., mechanical vibration) to achieve a significant reduction in the time required to obtain a desired remaining internal stress value (e.g., or a desired amount of internal stress reduction). FIGS. 3A and 3B illustrate an exemplary method 102 of stress-relief using two energy processes (e.g., heat and mechanical vibration) in accordance with the invention, FIGS. 4A and 4B illustrate exemplary Larson-Miller first order rate relationship curves for thermal and vibratory energy, respectfully. A Larson-Miller first order rate relationship or relationship curve, as used herein, includes any first order rate equation or logarithmic expression of the Arrhenius equation. FIG. 4C illustrates an exemplary system in which the stress relief techniques of the invention may be carried out, and FIG. 4D illustrates a plot of comparative stress relief results for aluminum structures processed in accordance with the invention together with structures processed using conventional stress-relief techniques.

In FIG. 3A, the method 102 begins at 104, wherein a thermal Larson-Miller curve (first order rate relationship) is determined for an induction heating stress-relief process, such as the exemplary plot 151 in FIG. 4A. In this example, the plot 151 includes a number of data points corresponding to measurements of 7055-T7 aluminum specimens or samples subjected to varying amounts of thermal stress-relief using different time and temperature settings. The test specimens were obtained from a single lot so as to have identical or nearly identical initial physical properties, and the samples were stressed and separated into two halves. A baseline stress measurement was taken on one of the halves to establish a baseline value for remaining internal stress in units of kpsi (thousand pounds per square inch). The samples were then stress relieved at different time and temperature values using thermal energy application, using induction heating equipment. The remaining internal stress was then measured for the stress-relieved samples, characterized in terms of percent remaining stress. A Larson-Miller equation for 7055-T7 aluminum was then employed to compute an L-M first order rate parameter value "Pt" for each of the stress-relieved samples. For example, the above equation (3) was used to calculate "Pt" for each sample, using the corresponding time "t" and temperature "T" (degrees K) used, wherein the value 10 was used for the constant "C" corresponding to this alloy. It is appreciated that different "C" values are used for different materials, for example, 20 for steel, 10–15 for titanium, etc., wherein other values may be obtained for other materials of interest. However, for a given structure, the same C value is used to obtain, and later calculate conditions for, all the operational values for a single stress relief procedure. The plot 151 was then constructed by plotting the first order rate parameters (e.g., "Pt" values) along the X axis 151x and the corresponding remaining percent internal stress values along the Y axis 151y as shown in FIG. 4A.

The following table 1 illustrates the data points used in constructing the exemplary L-M curve plot 151 in FIG. 4A. Although the plot 151 is illustrated in terms of percent stress relief (Y axis), equivalent L-M curves can be plotted in terms of absolute stress values, for example, in units of kpsi. In addition, reverse scales may alternatively be employed for the X axis values and/or for the Y axis values.

TABLE 1

| T (degrees F.) | T (minutes) | L-M parameter Pt | Stress Relief (%) |
|---|---|---|---|
| 275 | 0 | 14.9 | 25 |
| 275 | 2.5 | 14.99 | 31 |
| 275 | 10 | 15.44 | 26 |
| 275 | 24 | 15.71 | 34 |
| 290 | 0 | 14.9 | 25 |
| 290 | 5 | 15.52 | 31 |
| 290 | 16 | 15.9 | 34 |
| 290 | 24 | 16.03 | 37 |
| 300 | 0 | 14.9 | 25 |
| 300 | 5 | 15.73 | 33 |
| 300 | 16 | 16.12 | 40 |
| 300 | 24 | 16.25 | 54 |
| 325 | 0 | 14.9 | 25 |
| 325 | 5 | 16.25 | 41 |
| 325 | 16 | 16.65 | 77 |
| 325 | 24 | 16.78 | 97 |

The method 102 continues at 108, where an oscillatory Larson-Miller curve (e.g., first order rate relationship) is determined for a vibration stress-relief process, such as the exemplary plot 152 in FIG. 4B. A similar technique was employed to establish the four exemplary data points in the plot 152, wherein samples were initially stressed, then subjected to vibratory energy at or above the activation energy for 7055-T7 aluminum at ambient temperature (e.g., 70 degrees F. in this example) to reduce the internal stress. The stress-relieved samples were then measured to determine the remaining internal stress. The plot 152 of FIG. 4B was then constructed by plotting the "Pv" values along the X axis 152x and the corresponding remaining internal stress values along the Y axis 152y.

The following table 2 illustrates the data points used in constructing the exemplary L-M curve 152 in FIG. 4B.

TABLE 2

| T (hours) | L-M parameter Pt | Stress Relief (%) |
|---|---|---|
| 0 | 9 | 0 |
| 0.2 | 10.33 | 26.67 |
| 0.5 | 10.54 | 80 |
| 1.0 | 10.7 | 93.33 |

With the L-M relationship curves 151 and 152 for the thermal and oscillatory processes determined at 106 and 108, respectively, a first thermal L-M parameter Pt is determined at 110 that corresponds to a desired remaining internal stress value for the structure. In the illustrated example, 3% remaining internal stress was selected (e.g., 97% stress reduction) as the desired physical property value. Using this value along the Y axis 151y in FIG. 4A, a corresponding thermal L-M parameter Pt is identified along the X axis 151x from the plot 151, having a value of 16,800. At 112, an oscillatory L-M parameter Pv is determined from the oscillatory L-M curve 152 shown in FIG. 4B, that also corresponds to the desired remaining internal stress value. The desired remaining stress value (e.g., 3%) is located along the Y axis 152y in FIG. 4B, and the corresponding vibratory L-M parameter Pv is identified along the X axis 152x having a value of 10,800.

Referring again to the thermal L-M curve plot 151 in FIG. 4A, a final L-M parameter Pf is determined at 114 by subtracting the vibratory parameter Pv from the thermal parameter Pt (e.g., Pf=Pt−Pv=16,800−10,800=6,000). Using this Pf value of 6,000, one of a temperature setting and a time value is selected at 116 for the induction heating process, and the other is selected at 118 by solving the L-M equation for the remaining dependent variable. For instance, a temperature may be selected at 116, taking into account one or more limitations, including but not limited to equipment limitations (e.g., maximum temperatures possible with available heating equipment), material limitations (e.g., keeping the structure temperature below melting or other critical temperatures for the structure material), and heating the structure to above a temperature related to the activation energy of the material, etc. In this example, 300 degrees F. was selected for stress-relieving the aluminum structure without melting or altering the temper of the material. In other situations, the process temperature may be dictated by other considerations, such as an in-line process where the structures are being heat treated, and the temperature profile is fixed for the heating process, in which case the present invention may be employed to determine the time value for concurrent application of oscillatory energy or other second energy type while the structure is at temperature, is being cooled, or quenched.

At 120, the dependent variable is selected. In the illustrated example, the processing time t is determined according to the final L-M parameter Pf determined at 114 above (e.g., 6,000). In this example, the L-M equation (3) is solved for the time value t using the temperature T selected at 116 (e.g., 300 degrees F.), the constant (e.g., C=10 for aluminum), and the parameter Pf (e.g., 6,000), to yield a process time t=about 28.25 seconds for concurrent application of thermal and vibrational energy to achieve the desired 3% remaining internal stress value. One or more vibrational settings may be selected, for example frequency and/or amplitude, in order to provide oscillatory or time-varying energy at or above an activation energy of the aluminum material. One technique that may be employed involves determining a resonant frequency for the structure and the system in which the structure is to be processed, and selecting a frequency at or near (e.g., slightly below) the resonant frequency, wherein the frequency may be adjusted during processing. In this example, it is noted that separate application of heat at this temperature or of vibration alone for this time would not yield the desired stress-relief goal. Thus, the invention facilitates significant acceleration of stress-relief, as illustrated further below with respect to FIG. 4D. At 122, the induction heating and vibration processes are performed concurrently for at least the selected time value and according to the selected operation parameters for the induction heating and vibration processes, and the method 102 ends at 124.

As illustrated further in FIG. 3B, the thermal and oscillatory processes need not be exactly aligned in time, but need only be applied concurrently for the minimum time value at 122 to achieve the desired amount of internal stress relief within the scope of the invention. The stress-relief processing 122 begins at 130 in FIG. 3B, wherein the vibration process is initially started at 132 and continues until the selected amplitude and frequency are achieved at 134. The thermal processing begins at 136 (while the vibration continues) and the temperature is monitored at 138. Once the selected temperature setting is reached at 138 (e.g., 300 degrees F. in this example), the selected temperature and vibrational settings are maintained at 140 until the concurrent processing time t is determined at 142 to be at least the selected time value $t_{SEL}$. Thereafter, the application of thermal energy is discontinued at 144 and the vibration is continued at 146 until the structure temperature T is less than a critical temperature $T_{CRIT}$ (e.g., YES at 148), whereafter the vibration is discontinued at 150 and the method 102 ends at 124. Other implementations of concurrent application of multiple energy types are contemplated within the scope of the invention. For example, either processes (e.g., heat or vibration) may be started before the other one, or both may begin at the same time. Furthermore, either process may be continued after the other is discontinued or both may end at the same time. In order to prevent the buildup of new residual stresses due to the presence of thermal gradients, it may be desirable that the oscillatory energy level be maintained until the temperature falls below the value required for activation of dislocation motion. In this regard, the example illustrated in FIG. 3B is but one possible implementation within the scope of the invention, wherein the invention and the appended claims are not limited to the exemplary implementations illustrated and described herein. In one example, where thermal energy is already present, a temperature value is selected at which the second energy form is to be applied. For example, the temperature value might be selected as the highest operating temperature that a part will see in service, or the temperature at which a stress-inducing process concludes, or the temperature at which the part becomes solid after welding, which may then be used as the appropriate time in the process and temperature at which to apply the vibration or other oscillatory process.

The above techniques can then be used to determine Pt, Pv, and Pf using the first and second L-M relationships from either two first order rate relationships or from a single combined first order rate relationship characterizing concurrent application of multiple energy types. For example, where a thermal L-M curve and an oscillatory L-M curve are available, P3 may be calculated by subtracting P2 from P1. Once P3 is obtained, the previously selected temperature value may be used to determine the time for the concurrent energy application. The first and second energy types are applied concurrently for the appropriate time, beginning once the structure has reached the temperature value selected above, and then the thermal energy application is discontinued. The second (e.g., oscillatory) energy type may be continued thereafter until the structure temperature drops below activation energy for dislocation motion for improved stress relief results. This technique of continuing the second energy type after removal of the thermal energy source may advantageously prevent new residual stresses from being created by the thermal gradients inherently present during cooldown.

FIG. 4C illustrates an exemplary system 160 in accordance with another aspect of the invention, in which multiple energy types may be concurrently provided to a structure 162 to change a physical property thereof (e.g., internal stress, etc.) in accordance with the present invention. The system 160 comprises an induction heating system 164 operatively coupled with the structure 162 via cables or other coupling connections 166 to impart thermal energy to the structure 166, wherein the connections 166 may include coils for imparting fields in the structure 162 according to standard inductive heating techniques. The system 160 further includes a vibration system 170 coupled to impart oscillatory energy (e.g., mechanical vibration) to the structure 162 via connections 172, such as cables, mechanical actuators, etc. The heating and vibration systems 164 and 170 are operated according to control signals 174 and 176, respectively, from a control system 180, and feedback signals (e.g., vibration frequency, vibration amplitude, structure temperature, etc.) are provided along connections 182 from transducers (not shown) operatively coupled with the structure to the control system 180.

FIG. 4D illustrates a plot 190 of internal stress (kpsi) remaining in four 7055-T7 aluminum samples produced by an ASTM E8 tensile test, wherein all the tested specimens were selected from the same heat-treat and test lot, and tested under the same conditions to ensure that all the samples started with approximately equivalent internal stress states. The resulting internal stresses are illustrated following stress-relief processing according to four techniques at different depths below the sample surface, wherein the observed variation in stress with depth from the surface was a result of the manufacturing process and is typical for this product form. The stress results for a first sample (#1) are illustrated by a curve 191, the results for a second sample (#2) are illustrated by a curve 192, and the results for a third sample (#3) are illustrated by a curve 193. The fourth sample (#4) was tested according to the present invention using heat and vibration, and the exemplary results for the fourth sample are illustrated by a curve 194.

Sample #1 was stress-relieved using vibration only at a frequency of 53 Hz for 4 minutes, yielding the remaining internal stress shown in the curve 191. Sample #2 was stress-relieved using vibration only under similar frequency conditions for 24 minutes, resulting in the stress shown in curve 192. Sample #3 was stress-relieved using a thermal only process (no vibration) at 300 degrees F. for 4 minutes.

The fourth sample (#4) was stress relieved using concurrent application of thermal and vibratory energy for 4 minutes according to the invention, wherein the stresses are seen in the curve 194 to be approximately zero throughout the depth of the measurement. In the illustrated example, the fourth sample was processed generally according to the operational settings set for in the description of FIGS. 3A–4B above, using a temperature setting of about 300 degrees F. and vibrational settings selected to provide energy above the activation energy at or near a resonant frequency of the system in which the structure was mounted during processing. As the data demonstrates in FIG. 4D, the inventive process, in four minutes, stress-relieves the fourth sample (#4) sufficiently to meet the desired stress reduction goal in less time than either the vibration only or the thermal only techniques of the other samples.

Figure 5:
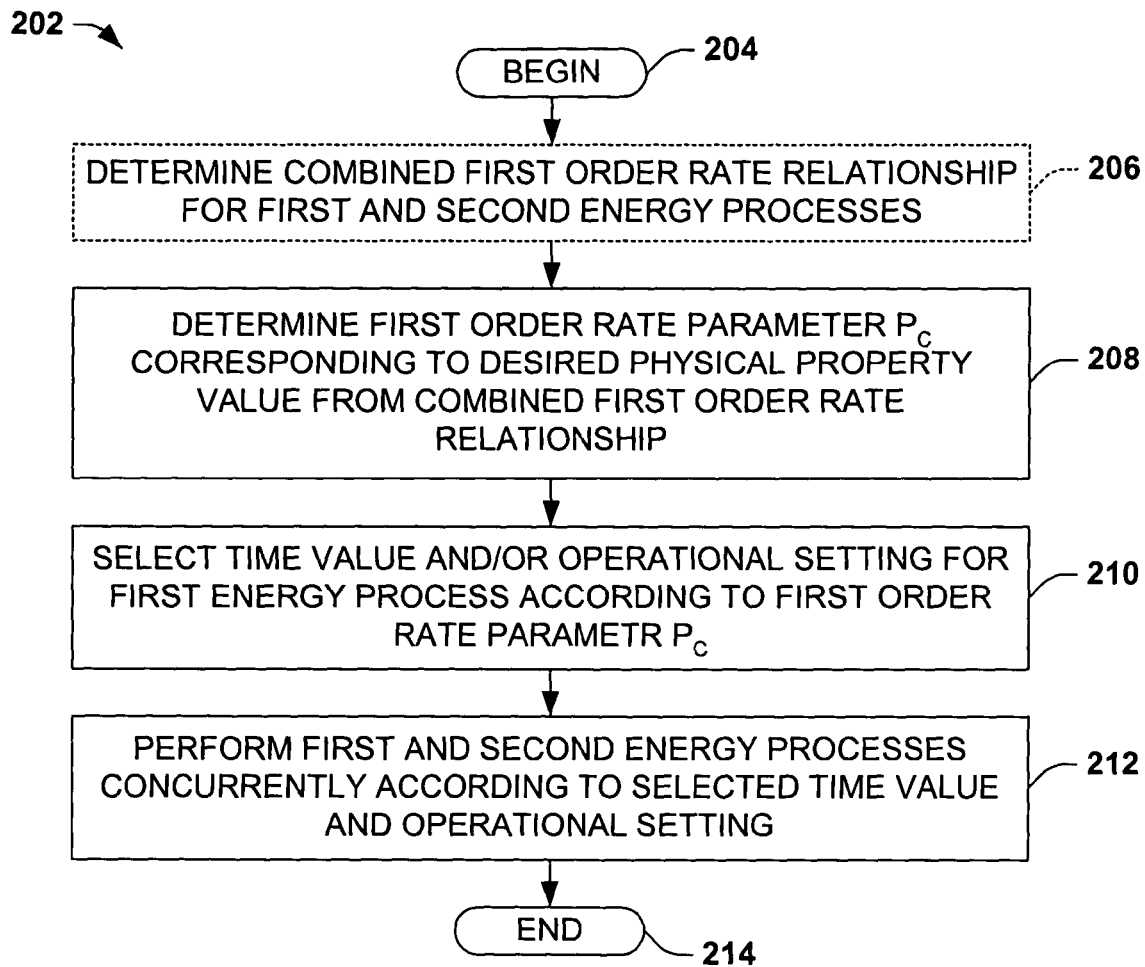
FIG. 5 is a flow diagram illustrating another exemplary method of changing a physical property of a structure using a combined first order rate relationship in accordance with the invention.

FIG. 5 illustrates another exemplary method 202 for changing a physical property of a structure and for determining operational settings for a concurrent multiple-energy process in accordance with the invention, beginning at 204. At 206, a combined first order rate relationship is determined for concurrent application of two or more energy types to a structure for changing a physical property thereof. In this method, the combined first order rate relationship relates concurrent application of the first and second energy types to the structure and a physical property of the structure, which may be a single L-M of other first order rate curve.

To develop a first order rate relationship (e.g., curve, equation, model, etc.) that combines the effects of concurrent application of two or more energy types for stress relief or other property change, the following technique may be used at 206. For the example of thermal and oscillatory energy types, the frequency dependence on temperature is believed to be strongly dependent on alloy and part configuration (e.g. including the mass, size, shape, etc. of the structure being processed and the system in which the structure is mounted during processing) and weakly dependent on temperature. Therefore, a frequency may be selected that is appropriate to the system and alloy. Fine-tuning may be done but generally the frequency will not vary greatly over a wide range of temperatures if the rest of the system is stable. Test coupons or samples, preferably from a single lot of material (alloy, etc.) of interest, can be used to derive test results for plotting a combined first order rate relationship curve. For residual or internal stress relief, generally tensile specimens may be produced per ASTM E8 or some suitable test method and tested appropriately to failure. One half of each broken tensile coupon is used for testing (e.g., measuring) the baseline residual stress. The other half of each tensile coupon is stress relieved using concurrent application of thermal and oscillatory energy (e.g., using the frequency setting determined above) at varying times and temperatures chosen to yield a wide range of L-M parameters within the limits of the heat source and time available. The resulting (e.g., measured) remaining stress values (e.g., or calculated amounts of stress relief) can then be plotted vs. the corresponding L-M parameter to generate the combined relationship curve, wherein at least five points are ideally used to determine the L-M curve for the combined (e.g., concurrent) processes.

The resulting combined first order rate relationship curve from 206 (e.g., or a suitable pre-existing combined first order rate relationship) is then used to determine time and temperature settings and parameters for process application. A combined first order rate parameter Pc is determined at 208 from the combined first order rate curve or relationship, corresponding to a desired value of the physical property of interest. Time and operational settings are selected at 210 for the concurrently applied energy types according to the first order rate parameter Pc, and the first and second energy types are concurrently provided to the structure at 212 according to the selected operational and time settings, and the method 202 ends at 214.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, assemblies, devices, circuits, systems, etc.), the terms used to describe such components (including a reference to a "means") are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

The invention claimed is:

1. A method of changing a physical property of a structure, comprising:
   providing a first energy to a structure by performing a first energy process according to an operational setting, at least one of the operational setting and a time value being selected according to a first order rate relationship for the first energy process, according to a first order rate relationship for a second energy process, and according to a desired physical property value; and
   providing a second energy to the structure by performing the second energy process;
   wherein the first and second energy processes are performed concurrently for at least the time value;
   wherein the first order rate relationship for the first energy process relates application of the first energy to the structure and a physical property of the structure;
   wherein the first order rate relationship for the second energy process relates application of the second energy to the structure and the physical property;
   wherein the first and second energies are different;
   wherein the total energy provided to the structure by the first and second energy processes is above an activation energy for the material of the structure;
   wherein the first energy is thermal and wherein the second energy is oscillatory;
   wherein the operational setting is a temperature setting, wherein one of the temperature setting and the time value is selected according to the first order rate relationship for the first energy process, according to the first order rate relationship for the second energy process, according to the desired physical property value, and according to the other one of the temperature setting and the time value; and
   wherein the first order rate relationship for the first energy process is a first Larson Miller relationship that relates application of thermal energy to the structure and the physical property, and wherein the first order rate relationship for the second energy process is a second Larson Miller relationship that relates application of oscillatory energy to the structure and the physical property.

2. The method of claim 1, further comprising:
   determining a first Larson Miller parameter according to the first Larson Miller relationship, the first Larson Miller parameter corresponding to the desired physical property value;
   determining a second Larson Miller parameter according to the second Larson Miller relationship, the second Larson Miller parameter corresponding to the desired physical property value;
   selecting a first one of the temperature setting and the time value;
   selecting a second one of the temperature setting and the time value according to the first and second Larson Miller parameters, according to the first Larson Miller relationship, and according to the first one of the temperature setting and the time value.

3. The method of claim 2, further comprising determining a third Larson Miller parameter according to the first and second Larson Miller parameters, wherein the second one of the temperature setting and the time value is selected according to the third Larson Miller parameter, according to the first Larson Miller relationship, and according to the first one of the temperature setting and the time value.

4. The method of claim 3, wherein determining the third Larson Miller parameter comprises subtracting the second Larson Miller parameter from the first Larson Miller parameter.

5. The method of claim 4, wherein selecting the second one of the temperature setting and the time value comprises evaluating the first Larson Miller relationship using the third Larson Miller parameter and the first one of the temperature setting and the time value to obtain the second one of the temperature setting and the time value.

6. The method of claim 1, wherein the physical property is internal stress, and wherein the desired physical property value is one of a remaining internal stress value and an internal stress reduction value.

7. A method of changing a physical property of a structure, comprising:
   providing a first energy to a structure by performing a first energy process according to an operational setting, at least one of the operational setting and a time value being selected according to a first order rate relationship for the first energy process, according to a first order rate relationship for a second energy process, and according to a desired physical property value; and
   providing a second energy to the structure by performing the second energy process;
   wherein the first and second energy processes are performed concurrently for at least the time value;

wherein the first order rate relationship for the first energy process relates application of the first energy to the structure and a physical property of the structure;

wherein the first order rate relationship for the second energy process relates application of the second energy to the structure and the physical property;

wherein the first and second energy are different;

wherein the total energy provided to the structure by the first and second energy processes is above an activation energy for the material of the structure; and wherein the first order rate relationship for the first energy process is a first Larson Miller relationship that relates application of the first energy to the structure and the physical property, and wherein the first order rate relationship for the second energy process is a second Larson Miller relationship that relates application of the second energy to the structure and the physical property.

8. The method of claim 7, further comprising:

determining a first Larson Miller parameter according the first Larson Miller relationship, the first Larson Miller parameter corresponding to the desired physical property value;

determining a second Larson Miller parameter according to the second Larson Miller relationship, the second Larson Miller parameter corresponding to the desired physical property value;

selecting a first one of the operational setting and the time value;

selecting a second one of the operational setting and the time value according to the first and second Larson Miller parameters, according to the first Larson Miller relationship, and according to the first one of the operational setting and the time value.

9. The method of claim 8, further comprising determining a third Larson Miller parameter by subtracting the second Larson Miller parameter from the first Larson Miller parameter, wherein the second one of the operational setting and the time value is selected according to the third Larson Miller parameter, according to the first Larson Miller relationship, and according to the first one of the operational setting and the time value.

10. The method of claim 9, wherein selecting the second one of the operational setting and the time value comprises evaluating the first Larson Miller relationship using the third Larson Miller parameter and the first one of the operational setting and the time value to obtain the second one of the operational setting and the time value.

11. A method of changing a physical property of a structure, comprising:

providing a first energy to a structure by performing a first energy process according to an operational setting;

providing a second energy to the structure by performing a second energy process;

wherein the first and second energy processes are performed concurrently to provide energy above an activation energy for the material of the structure for at least a time value;

wherein one of the operational setting and the time value are selected according to a desired physical property value and according to a first order rate relationship that relates concurrent application of the first and second energy to the structure and a physical property of the structure; and further comprising determining the Larson Miller relationship that relates concurrent application of the first and second energy to the structure and the physical property of the structure.

12. A method of stress relieving a structure, comprising:

determining a first Larson Miller relationship that relates application of thermal energy to the structure and internal stress in the structure;

determining a second Larson Miller relationship that relates application of oscillatory energy to the structure and the internal stress in the structure;

determining a first Larson Miller parameter according to the first Larson Miller relationship and according to a desired internal stress value for the structure;

determining a second Larson Miller parameter according to the second Larson Miller relationship and according to the desired internal stress value;

determining a third Larson Miller parameter according to the first and second Larson Miller parameters by subtracting the second Larson Miller parameter from the first Larson Miller parameter;

selecting a first one of a temperature setting and a time value;

selecting a second one of the temperature setting and the time value according to the third Larson Miller parameter, according to the first Larson Miller relationship, and according to the first one of the temperature setting and the time value;

selecting one or more oscillatory operational settings;

providing thermal energy to the structure according to the thermal operational settings; and concurrently providing oscillatory energy to the structure according to the oscillatory operational settings for a time greater than or equal to the time value.

13. The method of claim 12, wherein selecting the second one of the temperature setting and the time value comprises solving a first Larson Miller equation for the second one of the temperature setting and the time value using the first one of the temperature setting and the time value and the third Larson Miller parameter, wherein the first Larson Miller equation represents the first Larson Miller relationship.

14. A method of determining operational settings and time values for concurrent application of multiple energy forms to a structure to change a physical property of the structure, the method comprising;

determining a first parameter according to a desired physical property value for the structure and according to a first order rate relationship for a first energy process that relates application of a first energy to the structure and the physical property;

determining a second parameter according the desired physical property value and according to a first order rate relationship for a second energy process that relates application of a second energy to the structure and the physical property;

selecting a first one of a time value and an operational setting for the first energy process; and selecting a second one of the time value and the operational setting according to the first and second parameters, according to the first order rate relationship for the first energy process, and according to the first one of the time value and the operational setting;

wherein the first order rate relationship for the first energy process is a first Larson Miller relationship that relates application of the first energy to the structure and the physical property, and wherein the first order rate relationship for the second energy process is a second Larson Miller relationship that relates application of the second energy to the structure and the physical property.

* * * * *